United States Patent [19]
Perry

[11] Patent Number: 5,288,281
[45] Date of Patent: Feb. 22, 1994

[54] CONTIUOUSLY VARIABLE TRANSMISSIONS

[76] Inventor: Forbes G. Perry, Long Meadow, Church Street, Charlbury, Oxon OX7 3PP, England

[21] Appl. No.: 838,309
[22] PCT Filed: Aug. 29, 1990
[86] PCT No.: PCT/GB90/01336
   § 371 Date: Mar. 11, 1992
   § 102(e) Date: Mar. 11, 1992
[87] PCT Pub. No.: WO91/05183
   PCT Pub. Date: Apr. 18, 1991

[30] Foreign Application Priority Data
   Sep. 26, 1989 [GB] United Kingdom ......... 8921672

[51] Int. Cl.⁵ ............ F16H 37/08; F16H 15/38
[52] U.S. Cl. .................... 475/191; 475/192; 476/40
[58] Field of Search ............. 74/730.1, 732.1; 475/83, 191, 192, 216, 217, 219, 330; 476/32, 40

[56] References Cited

U.S. PATENT DOCUMENTS

| | | | |
|---|---|---|---|
| 2,239,087 | 4/1941 | Erban | 475/192 X |
| 3,918,325 | 11/1975 | Frost | 475/82 |
| 4,008,628 | 2/1977 | Orshansky, Jr. | 475/81 |
| 4,355,547 | 10/1982 | Poole et al. | 475/217 |
| 4,638,687 | 1/1987 | De Brie Perry | 475/191 |
| 4,691,091 | 9/1987 | Perry | |
| 4,936,165 | 6/1990 | Doyle et al. | 475/330 X |
| 4,957,474 | 9/1990 | Kemper | 475/330 X |
| 4,976,666 | 12/1990 | Meyerle | 475/83 |
| 5,139,466 | 8/1992 | Perry | 74/721 X |

FOREIGN PATENT DOCUMENTS

| | | | |
|---|---|---|---|
| 0078124 | 5/1983 | European Pat. Off. | |
| 0301590 | 2/1989 | European Pat. Off. | |
| 63-163056 | 7/1988 | Japan | 476/40 |
| 2-120548 | 5/1990 | Japan | 476/40 |
| 89/09898 | 10/1989 | PCT Int'l Appl. | |
| 1000233 | 8/1965 | United Kingdom | 476/40 |

*Primary Examiner*—Leslie A. Braun
*Assistant Examiner*—Ryan W. Massey
*Attorney, Agent, or Firm*—Walter C. Farley

[57] ABSTRACT

A continuously variable transmission in which a transmission unit provides a variable speed ratio between an input member (2) and an output member (3). The output member drives an output transmission member (11) by way of a power recirculation system (7-10) in a first regime of the transmission, through a selectable transmission path (30-34) providing a fixed ratio drive from the input member to the output transmission member, and having a selectable regime which provides a transmission path (19-23) from the output member to the output transmission member. The transmission is arranged so that only a clutching operation is required to effect a synchronous changeover between regimes.

13 Claims, 3 Drawing Sheets

CONTIUOUSLY VARIABLE TRANSMISSIONS

FIELD OF THE INVENTION

This invention relates to a continuously variable transmission in which, for one mode or regime of operation the output member of a variator, such as a toroidal race, rolling traction variator, drives an output shaft or other transmission member by way of an epicyclic movement providing power recirculation. For a toroidal race rolling traction variator the variation in transmission ratio is effected by means for altering the rotary axes of rollers which engage toroidal races defined by the input and output members of the variator.

The transmission may have another regime in which the output member of the variator drives the output transmission directly, such as through a simple gearing or chain connection.

In both the aforementioned regimes the transmission ratio between the input and output members in the variator can be continuously varied between a minimum and a maximum. Normally the first regime is employed for speed ratios between reverse and low forward speed and the second regime is employed for higher speeds. Various examples of such transmissions are well known.

BACKGROUND OF THE INVENTION

An earlier International patent application published under serial number WO89/09898 describes a vehicle transmission in which the change over between two regimes, corresponding to the two regimes described above, may be a shockless synchronous change, there being no change in overall transmission ratio during the change in regimes, and the transmission is considerably simplified over earlier vehicle transmission systems, avoiding the use of parallel transmission paths between the power recirculation system and the output transmission member and the consequent necessity of a change in transmission path within the first regime.

The transmission is arranged such that when the first or "low" regime provides a maximum forward speed, the ratio of the variator is at its maximum reduction and this corresponds to the minimum forward speed provided in the "high" regime. A change over between regimes under these circumstances is a shockless synchronous change. Only simple declutching and clutching operations are required for the change over and, where clutches are provided in both the transmission path directly from the output member of the variator to the output transmission member (such as the output shaft) and in the transmission path between the power recirculation system and the said output transmission member, both clutches could be engaged during the change over between regimes.

SUMMARY OF THE INVENTION

An object of the present invention is to provide, for a transmission having at least the first mentioned regime of operation, a selectable transmission path which by-passes the power recirculation system, i.e. the epicyclic system, and provides a fixed transmission ratio.

Another object of the invention is to provide such a selectable transmission path in a transmission which has two regimes as previously described.

According to one aspect of the present invention there is provided a continuously variable transmission in which a transmission unit provides a variable speed ratio between an input member and an output member; the output member is operable to drive an output transmission member through at least a power recirculation system in a selectable regime of the transmission, and through a selectable transmission path providing a fixed ratio drive from the input member to the output transmission member.

The transmission may have a selectable second regime which provides a transmission path from the output member of the variator to the output transmission member.

According to another aspect of the invention there is provided a continuously variable transmission in which a transmission unit provides a variable speed ratio between an input member and an output member; and comprising three selectable transmission paths, a first path coupling the output member to an output transmission member through a power recirculation system, a second path providing a fixed ratio drive from the input member to the output transmission member, and a third path coupling the output member to the output transmission member.

There may be provided for the output transmission member a clutch assembly for the selection of the various transmission paths.

BRIEF DESCRIPTION OF THE DRAWINGS

The invention will now be described by way of example with reference to the accompanying drawings, in which.

DESCRIPTION OF THE PREFERRED EMBODIMENTS

Figure 1:
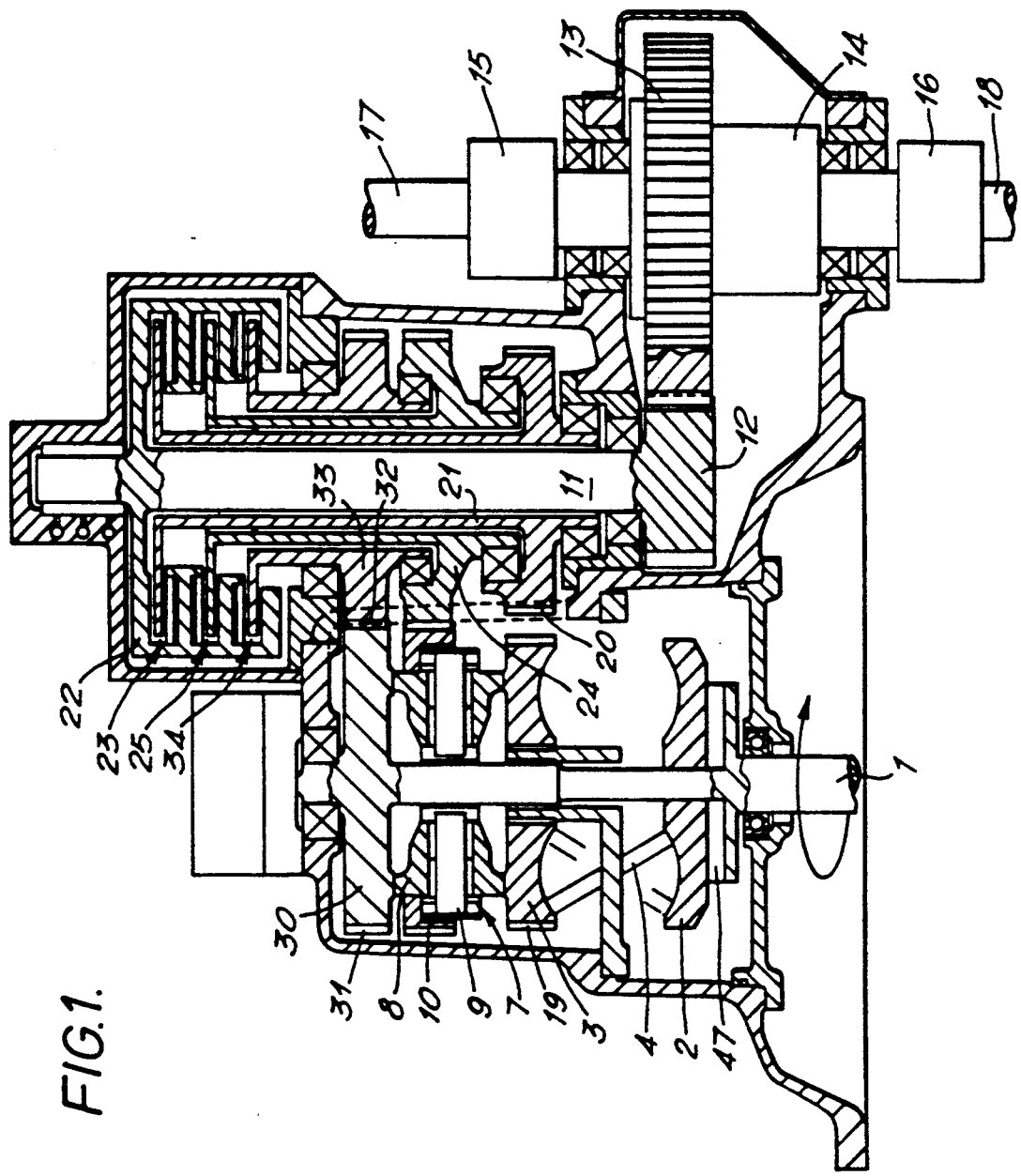
FIG. 1 illustrates one embodiment of the invention.

Referring firstly to the transmission system shown in FIG. 1, an input shaft 1 for the transmission unit has fixed to it a first, input member 2 of a variable transmission unit, herein called a variator, comprising a toroidal race confronting a second, output member 3 of the unit likewise comprising a toroidal race. Rollers 4 engage the two toroidal races and by means of a known adjusting system can be changed in their axes of rotation to provide a continuously variable transmission ratio between the input and output members of the unit.

Also fixed relative to or integral with the input shaft 1 is a disc 30 confronting the rear face of the output member 3. Between the disc 30 and the output member 3 is a power recirculation system comprising an epicyclic carrier 7 supporting rollers 8 (of which two are shown) engaging the confronting axially directed faces of the output member 3 and the disc 30. The roller 8 are mounted on a radially directed spindle 9 in the carrier, the onward connection from which will be described later. The rollers 8 support the end thrust on the output member 3 of the variator provided by a mechanical cam loading device 47 well known in the art.

An output transmission member for the transmission is constituted in this embodiment by an output shaft 11 carrying a final drive pinion 12 engaging an input pinion 13 of, for example, a differential 14 which is connected, for example in a manner well known in itself, to constant velocity joints 15 and 16 driving half shafts 17 and 18 respectively. It should be understood however that these final drive arrangements are described only by way of an example in which the embodiment may be used as part of a front wheel drive for a vehicle.

The output member 3 of the variator has a geared annulus 19 engaging by way of a chain connection a geared annulus 20 on a sleeve member 21 which is coaxial with output shaft 11 and which can drive by way of a clutch 23 a sleeve 22 integral with or fixed to the final output drive shaft 11 of the transmission. The connection between the output member 3 and the output transmission shaft 11 is thereby a simple transmission path. In an alternative form it may be constituted by a gear train, possibly including idlers.

The transmission path between the roller epicyclic and the output drive shaft 11 is by way of a geared annulus 10 of the epicyclic engaging a geared sleeve 24 which may be connected to the sleeve 22, and thereby to the shaft 11, by the clutch 25. Once again this is a simple transmission path, and in FIG. 1 is shown as having only a single drive connection between the power recirculation system and the output transmission member 11. In an alternative form the drive connection may be constituted by a simple direct chain connection. The geared sleeve 24 is coaxial with the output shaft 11.

The disc 30, which rotates with the input shaft 1, has a geared annulus 31 which engages a geared annulus 32 on a sleeve 33 coaxial with output shaft 11. Sleeve 33 can drive, by way of a clutch 34, the sleeve 22, and thence the output shaft 11. Thus this embodiment of the invention has a selectable transmission path which provides a fixed transmission ratio. The transmission path between disc 30 and the output drive shaft 11 is shown as a simple geared connection, although a simple direct chain connection, or a gear train including idlers may be used instead. When clutch 34 is engaged, the input power supplied to input shaft 1 is transmitted directly from the fixed disc 30 to the sleeve 33 and then to the sleeve 22. The variable unit idles at maximum ratio.

To summarize the operation of the embodiment of FIG. 1, when clutch 23 is engaged, power flows from the input shaft 1 and disc 30 through the roller assembly 8 to output disc 3 from which it is coupled by a toothed belt or the like to geared annulus 20, causing rotation of sleeve 21. Because clutch 23 is engaged, power is then transmitted to sleeve 22 and output shaft 11.

When clutch 25 is engaged, power flows from input shaft 1 and disk 30 to roller assembly 8 which rotates about shaft 1 and carries with it geared annulus 10 which meshes with gear 24. This causes rotation of the sleeve of which gear 24 is a part and drives the output shaft through clutch 25. In addition, there is an internal torque recirculation path from shaft 1 and disc 2 through rollers 4 and output disc 3 of the variator and planet wheels 8 which also ride on disc 30, attached to shaft 1. The planet carrier, geared annulus 10, is driven at a speed which is in accordance with the difference of the speeds of discs 3 and 30. The flow of the torque may be clockwise or counterclockwise, depending on the torque at the output drive (members 12 and 13) or the torque at shaft gear 24 and clutch 25.

When clutch 34 is engaged, power is transmitted directly from the input shaft and disc 30 to gear 33 which engages disc 30, rotating sleeve 22 and the output shaft through the engaged clutch.

If the transmission having the selectable fixed transmission ratio is to be fitted to a car, the additional fixed ratio may be chosen as an overdrive, i.e. to be numerically the same as or near to the highest ratio of the variable high regime.

The additional fixed ratio provides a high efficiency cruising ratio particularly suited to cars with larger engines and ample reserve torque, which do not need frequent changes down in ratio when slightly more power is required. However, the fixed ratio does not have to be an overdrive.

Two-regime systems normally have a "low" regime in which the transmission ratio between input and final output is variable between reverse to low forward speed through a neutral phase known as "geared idle". In this regime power recirculation takes place through one or more epicyclic systems, as in the embodiment shown in FIG. 1. In a "high" regime, the overall transmission ratio extends from a low forward speed to a full speed, which is usually an overdrive speed; in this regime the output from the variable transmission unit or variator is coupled simply, that is to say not through any epicyclic system, to the output transmission member, namely the final output shaft.

The embodiment shown in FIG. 1 is of this kind as far as the two variable transmission regimes are concerned. It employs a roller recirculation system, which is known per se, instead of the more usual epicyclic geared connection in the "low" regime. The ratios are so chosen that when the "low" power recirculation regime provides a maximum forward speed, the ratio of the variable unit is at its maximum reduction. Typically, where the transmission ratio within the variable transmission unit can vary between 1.6 and 0.4, the corresponding range of variation in the overall transmission ratio between input and final output shaft extends from $-0.35$ (when the ratio within the variable transmission unit is 1.6) to $+0.40$ (when the variable ratio within the variable transmission unit corresponds to 0.4). Again, these figures are given by way of example only. The point at which the maximum reduction within the variable transmission unit occurs corresponds to the maximum reduction in the unit for the "high" regime. Thus the change over between regimes can be shockless and synchronous.

The synchronous change over between regimes is effected by means of selective operation of the clutches 23, 25 and 34. The two clutches involved in a change could be engaged together during the change over phase.

In the embodiment of FIG. 1, only a synchronous clutch-changing operation is required in shifting regimes and accordingly the embodiment provides a continuously variable transmission ration between, typically, 0.35 reverse, through geared idle to, typically, 1.8:1 overdrive.

Figure 2:
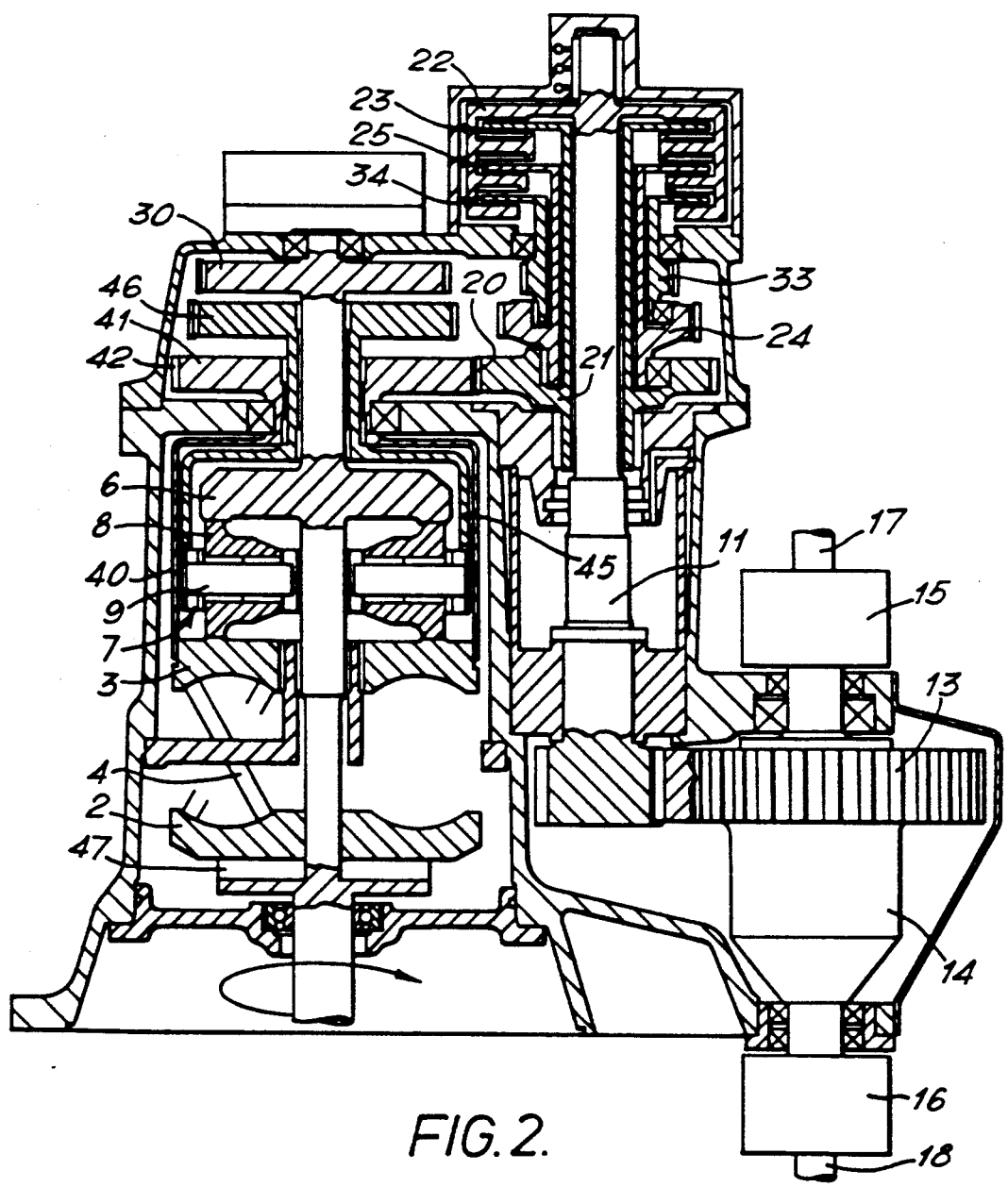
FIG. 2 illustrates a second embodiment of the invention.

In the embodiment shown in FIG. 2, the output member 3 of the variable transmission unit is connected by way of a sleeve 40 coaxial with the input shaft to a gear 41 which has a geared annulus 42. The geared annulus 42 engages with the further geared annulus 20 on the sleeve 21. The roller carrier 7 is connected by way of a sleeve 45 coaxial with the input shaft to a gear 46 which drives the geared sleeve 24 through a chain connection. The rollers 8 are supported by the carrier and engage the confronting axially directed faces of the output member 3 and a disc 6. The disc 6 is fixed relative to or integral with the input shaft 1.

The geared disc 30 is fixed to or integral with the input shaft as described with reference to FIG. 1. The disc 30 drives geared sleeve 33 through a chain connection, although the transmission system may be constituted by a gear train, instead. Sleeve 33 can drive, by way of a clutch 34, the sleeve 22, and hence the output shaft 11. Similarly, sleeve 24 can drive the output shaft 11 by way of clutch 25 and sleeve 22, and sleeve 21 can drive the output shaft by way of clutch 23 and sleeve 22.

Thus, the flow of power in the embodiment of FIG. 2 when clutch 23 is engaged is from the input shaft and disc 6, which rotate together, through rollers 8 to output disk 3 which is attached to sleeve 40. as sleeve 40 rotates, it rotates gear 41, 42 which is coupled to gear 20, thus rotating sleeve 21 and transmitting the power to output shaft 11 through clutch 23.

When clutch 25 is engaged, the power flow is from disk 6 to rollers 8 which cause rotation of shaft 9 about the axis of the input shaft at a speed determined by the difference in speeds of discs 6 and 3, as discussed with reference to FIG. 1. Rotation of shaft 9 causes sleeve 45 to rotate, rotating gear 46 which drives gear 24 through a belt drive or the like. The sleeve which is part of gear 24 delivers power to the output shaft through clutch 25.

Engagement of clutch 34 permits a direct connection from the input shaft and gear 30 to gear 33 through a belt drive, causing rotation of the sleeve which is a part of gear 30 to deliver power to the output shaft through clutch 34.

In this embodiment the additional fixed ratio is provided in a manner similar to the embodiment shown in FIG. 1.

In the embodiments shown the speed ratio of the roller epicyclic is 1:1, but this does not have to be the case; the ratio can be skewed in favour of forward or reverse so as to provide a higher maximum overall transmission ratio in reverse at the expense of a lower maximum overall transmission ratio in forward movement or vice versa according to preference. This skewing may be achieved, by inclining the axes of the epicyclic rollers at an angle other than 90° to the main axis of the variator.

In FIG. 1 the drive connection from the output member 3 to the final drive shaft is disposed internally, that is to say inboard of the roller epicyclic system. However for transmission systems intended for higher power outputs it may be preferable to adopt the configuration shown in FIG. 2, wherein the drives from the output member 3 of the variable transmission unit, both direct and by way of the roller epicyclic, are brought out to the rear of the transmission system. However, the embodiment of FIG. 1 is preferable if the length of the system should be kept to a minimum.

In these embodiments of the invention, the operations of declutching and clutching required for changing the regimes can always be made synchronous. Even if the range of output speed ratio of the roller recirculator section is not itself numerically convenient for a synchronous change, the reduction or step up ratios possible in the drive connections to the final drive member make speed matching always feasible to achieve a synchronous change.

Figure 3:
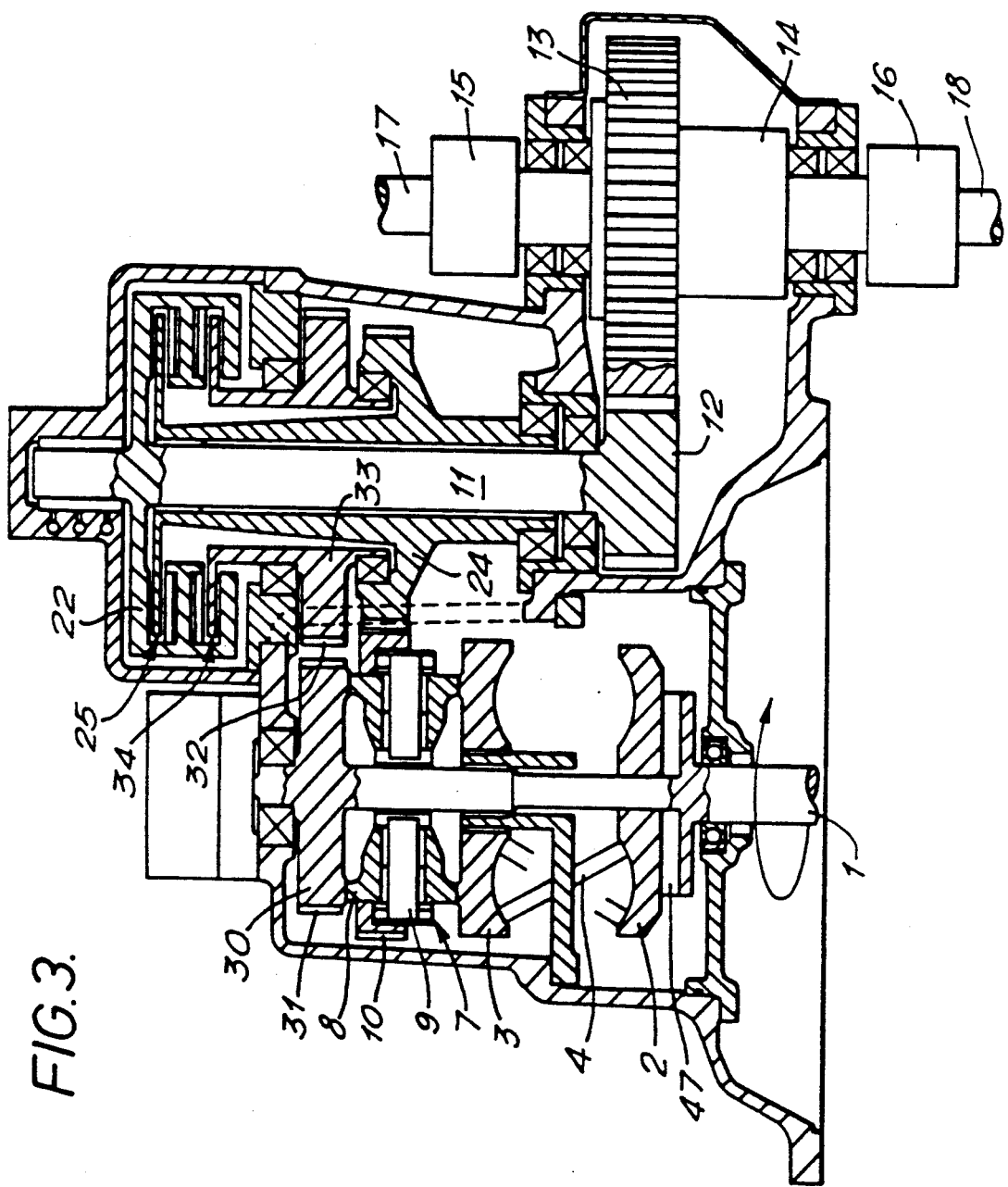
FIG. 3 illustrates a further embodiment of the invention.

FIG. 3 shows a further embodiment of the invention, particularly suited for use in vehicles such as fork lift trucks and dump trucks, for which forwards and backwards movement is needed, but only a low forward top speed is required. The embodiment shown in FIG. 3 is substantially similar to the embodiment shown in FIG. 1, but the transmission path from the output disc 3 to the output shaft 11 can be omitted, and the direct drive (30, 31, 32) from the input shaft may be provided by a reduction train, preferably with an idler gear between geared annulus 31 and geared annulus 32 on sleeve 33, and may be numerically at or near the maximum forward ratio of the low regime; alternatively a chain connection may be used.

Thus, when clutch 25 is engaged, power is delivered from disc 30 to rollers 8, causing rotation of shaft 9 about the axis of the input shaft and carrying with it gear 10 which meshes with gear 24. The sleeve forming a part of gear 24 therefore rotates, delivering power to the output shaft through clutch 25.

When clutch 34 is engaged, power is delivered directly from disc 30 and geared annulus 31 to gear 33 through a belt or chain drive, causing rotation of the sleeve of which gear 33 is a part and delivering power through clutch 34.

The arrangement of the transmission system according to this embodiment has the advantage that the maximum vehicle speed available is limited by this maximum forward ratio of the low regime, and by the engine speed, both of which can be pre-set to a safe level for the type of vehicle under consideration.

I claim:

1. A continuously variable transmission comprising
  a variable transmission unit having an input member (2) and an output member (3);
  means for providing a variable speed ratio between said input member and said output member;
  an output transmission member (11);
  a power recirculation system (7-10) coupled between said input member and said output member of said variable transmission unit;
  a first selectable operating regime with a drive path (10, 24, 25) from said power recirculation system to said output transmission member; and
  a selectable fixed-ratio drive path (30-34) from said input member of the variable transmission unit to said output transmission member.

2. A transmission according to claim 1 wherein, in said first regime, said transmission ratio between said input member and said output transmission member is variable from a reverse ratio to a low forward ratio.

3. A transmission according to claim 2 wherein the transmission ratio of the fixed ratio drive is substantially equal to said forward ratio of said first regime.

4. A transmission according to claim 2 and having a second selectable regime comprising a transmission path (19-23) from said output member to said output transmission member.

5. A transmission according to claim 4 wherein, in said second regime, said transmission ratio between the input member and the output transmission member is variable from said forward ratio to a higher forward ratio.

6. A transmission according to claim 5 wherein said transmission ratio of said fixed ratio drive is substantially equal to the maximum ratio of said second regime.

7. A transmission according to claim 4 and comprising clutching means operable to effect a synchronous change between the regimes.

8. A continuously variable transmission comprising
  an output transmission member;
  a transmission unit having an input member (2), an output member (3) and a power recirculation system (7-10);
  means in said transmission unit for providing three selectable transmission paths including a first path coupling said output member to said output transmission member through said power recirculation system (7–10), a second path providing a fixed ratio drive from said input member to said output transmission member, and a third path coupling said output member to said output transmission member.

9. A transmission according to claim 8 and comprising a clutch assembly (23, 25, 34) for selecting said transmission paths.

10. A transmission according to claim 9 and including a single drive connection between said power recirculation system and said output transmission member.

11. A transmission according to claim 10 in which said variable ratio transmission is a toroidal race rolling traction unit.

12. A transmission according to claim 11 in which said power recirculation system is a roller epicyclic.

13. A transmission according to claim 12 in which the roller epicyclic comprises a rotary carrier (7) supporting a plurality of epicyclic rollers (8) in engagement with the said output member (3).

* * * * *